(12) United States Patent
Ihde et al.

(10) Patent No.: US 12,172,248 B2
(45) Date of Patent: *Dec. 24, 2024

(54) WELD ELECTRICAL AND GAS CONNECTOR WITH SEALED GAS FLOW

(71) Applicant: Illinois Tool Works Inc., Glenview, IL (US)

(72) Inventors: Jeffery Ray Ihde, Greenville, WI (US); Thomas Don Lahti, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,238

(22) Filed: Jan. 31, 2023

(65) Prior Publication Data

US 2023/0182227 A1 Jun. 15, 2023

Related U.S. Application Data

(60) Division of application No. 16/134,706, filed on Sep. 18, 2018, now Pat. No. 11,565,340, which is a
(Continued)

(51) Int. Cl.
B23K 9/32 (2006.01)
(52) U.S. Cl.
CPC .................................. B23K 9/323 (2013.01)
(58) Field of Classification Search
CPC .................................. B23K 9/323; B23K 9/32
(Continued)

(56) References Cited

U.S. PATENT DOCUMENTS

| 495,064 A | 4/1893 | Schrader |
| 2,135,962 A | 11/1938 | Conery |

(Continued)

FOREIGN PATENT DOCUMENTS

| CN | 201054391 | 4/2008 |
| CN | 201519837 | 7/2010 |

(Continued)

OTHER PUBLICATIONS

International Search Report for application No. PCT/US2011/030779 mailed Jul. 7, 2011.
(Continued)

*Primary Examiner* — Nathaniel E Wiehe
*Assistant Examiner* — Alba T Rosario-Aponte
(74) *Attorney, Agent, or Firm* — McAndrews, Held & Malloy, Ltd.

(57) ABSTRACT

An example welding cable connector system comprises: a male connector comprising a first conductive body for conveying welding power, a first sealed passageway disposed coaxially of the first conductive body for conveying shielding gas, and a first preassembled valve assembly coupled to threads within the first sealed passageway and configured to stop flow of the shielding gas when the male connector is not engaged; and a female connector comprising a second conductive body for conveying the welding power, a second sealed passageway disposed coaxially of the conductive body for conveying the shielding gas, and a second preassembled valve assembly coupled to threads within the second sealed passageway and configured to stop the flow of the shielding gas when the female connector is not engaged.

5 Claims, 6 Drawing Sheets

Related U.S. Application Data continuation of application No. 13/356,916, filed on Jan. 24, 2012, now Pat. No. 10,076,803.

(58) Field of Classification Search
USPC ........ 219/137.63, 137.9, 74, 137.62, 137.31, 219/137.61, 137.71, 121.5
See application file for complete search history.

(56) References Cited

U.S. PATENT DOCUMENTS

| | | | |
|---|---|---|---|
| 2,963,570 A | 12/1960 | Rieppel | |
| 3,065,438 A | 11/1962 | Anderson | |
| 3,220,459 A | 11/1965 | Wilson | |
| 3,314,088 A | 4/1967 | Nordhaus | |
| 4,031,917 A | 6/1977 | Dejohn | |
| 4,049,943 A * | 9/1977 | Pratt | B23K 9/323 219/136 |
| 4,193,419 A * | 3/1980 | Pellerito | F16L 29/02 137/322 |
| 4,210,796 A * | 7/1980 | Moerke | B23K 9/323 219/137.9 |
| 4,263,788 A | 4/1981 | Beimgraben | |
| 4,338,793 A | 7/1982 | Ohernjr | |
| 4,901,747 A | 2/1990 | Yabor | |
| 4,939,339 A * | 7/1990 | Folkening | B23K 9/323 219/137.62 |
| 5,080,132 A | 1/1992 | Manz | |
| 5,258,599 A * | 11/1993 | Moerke | B23K 9/295 219/121.48 |
| 5,338,917 A | 8/1994 | Stuart | |
| 5,378,870 A | 1/1995 | Krupnicki | |
| 5,857,866 A | 1/1999 | Felps | |
| 5,902,150 A | 5/1999 | Sigl | |
| 6,706,994 B1 | 3/2004 | Sloan | |
| 6,709,994 B2 * | 3/2004 | Miller | D06N 5/00 442/364 |
| 6,797,923 B2 | 9/2004 | Delgado | |
| 7,377,825 B2 * | 5/2008 | Bankstahl | B23K 9/32 439/337 |
| 9,061,367 B2 | 6/2015 | Ihde | |
| 10,076,803 B2 | 9/2018 | Ihde | |
| 11,565,340 B2 * | 1/2023 | Ihde | B23K 9/323 |
| 2009/0212034 A1 | 8/2009 | Willenkamp | |
| 2011/0247999 A1 * | 10/2011 | Ihde | B23K 9/323 219/74 |
| 2011/0290345 A1 | 12/2011 | Vandrak | |

FOREIGN PATENT DOCUMENTS

| | | |
|---|---|---|
| DE | 8235774 | 10/1987 |
| WO | 2011130016 | 10/2011 |
| WO | 2011130095 A2 | 10/2011 |

OTHER PUBLICATIONS

International Search Report from PCT application No. PCT/US2013/022644 dated May 17, 2013, 15 pgs.
Poppet Valve, Wikipedia, URL:http://en.wikipedia.org/wiki/Poppet_valve, last updated on Aug. 18, 2013.
Canadian Office Action Appln No. 2,855,393 dated Jan. 23, 2018 (5 pages).
Yumin Xing; et al, "Bicycle Practical Handbook—The Third Volume", Light Industry Press, Oct. 1985, pp. 429-434.

* cited by examiner

WELD ELECTRICAL AND GAS CONNECTOR WITH SEALED GAS FLOW

BACKGROUND

The invention relates generally to welding systems and, more particularly, to a weld electrical and gas connector with sealed gas flow.

Welding is a process that has become increasingly ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeder to ensure a proper wire feed reaches a welding torch, as well as gas-channeling tubes or cables for routing shielding gas to the torch during the time a welding arc is created between the wire and a workpiece.

Welding power sources used in such applications are designed to provide power for welding, while wire feeders are used to deliver welding wire to a welding torch. Shielding gas may be provided to the power supply, and therefrom to the wire feeder, where a weld cable routes the wire, gas, and power to the torch. Cables connect welding power sources to wire feeders and wire feeders to welding torches. Other welding equipment is also connected using cables. Some welding systems utilize cable bundles to capture the quantity of cables that may be used to connect welding equipment. For example, a welding system may include up to three separate cables for connecting between any two welding devices, a cable for each of power, gas, and data. As such, certain cable assemblies may be constructed to transport welding power and shielding gas in a single cable. Unfortunately, such cable assemblies may include a large number of components and may be complicated to construct. Accordingly, there exists a need for welding cable assemblies that overcome such disadvantages.

BRIEF DESCRIPTION

In one embodiment, a welding cable connector system includes a male connector having a first conductive body for conveying welding power. The male connector includes a first sealed passageway disposed coaxially of the first conductive body for conveying shielding gas, and a first Schrader valve configured to stop flow of shielding gas when the male connector is not engaged. The cable connector system also includes a female connector having a second conductive body for conveying welding power. The female connector includes a second sealed passageway disposed coaxially of the conductive body for conveying shielding gas, and a second Schrader valve configured to stop flow of shielding gas when the female connector is not engaged. The male and female connectors are mutually engageable to conduct welding power and shielding gas therethrough. The first and second Schrader valves seal the flow of shielding gas when the connectors are not mutually engaged.

In another embodiment, a welding cable connector system includes a connector having a conductive body for conveying welding power to or from a mating connector. The connector system also includes a sealed passageway disposed coaxially of the conductive body for conveying shielding gas to or from the mating connector. The sealed passageway includes threads configured to engage a preassembled valve assembly.

In another embodiment, a welding cable connector system includes a male connector having a first conductive body for conveying welding power. The male connector also includes a first sealed passageway disposed coaxially of the first conductive body for conveying shielding gas, and a first preassembled valve assembly coupled to threads within the first sealed passageway and configured to stop flow of shielding gas when the male connector is not engaged. The connector system also includes a female connector having a second conductive body for conveying welding power. The female connector also includes a second sealed passageway disposed coaxially of the conductive body for conveying shielding gas, and a second preassembled valve assembly coupled to threads within the second sealed passageway and configured to stop flow of shielding gas when the female connector is not engaged. The connector system includes a welding cable coupled to at least one of the male and female connectors for conveying welding power and shielding gas to or from the coupled connector. The male and female connectors are mutually engageable to conduct welding power and shielding gas therethrough. The first and second preassembled valve assemblies seal the flow of shielding gas when the connectors are not mutually engaged.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a weld electrical and gas connector with sealed gas flow are provided that may facilitate fewer components and simplified construction. For example, in certain embodiments a Schrader valve is used to control the flow of gas through the connectors, while in other embodiments a preassembled valve assembly is used to control the flow of gas through the connectors. In either case, the connectors are manufactured in a simplified manner using fewer components.

Figure 1:
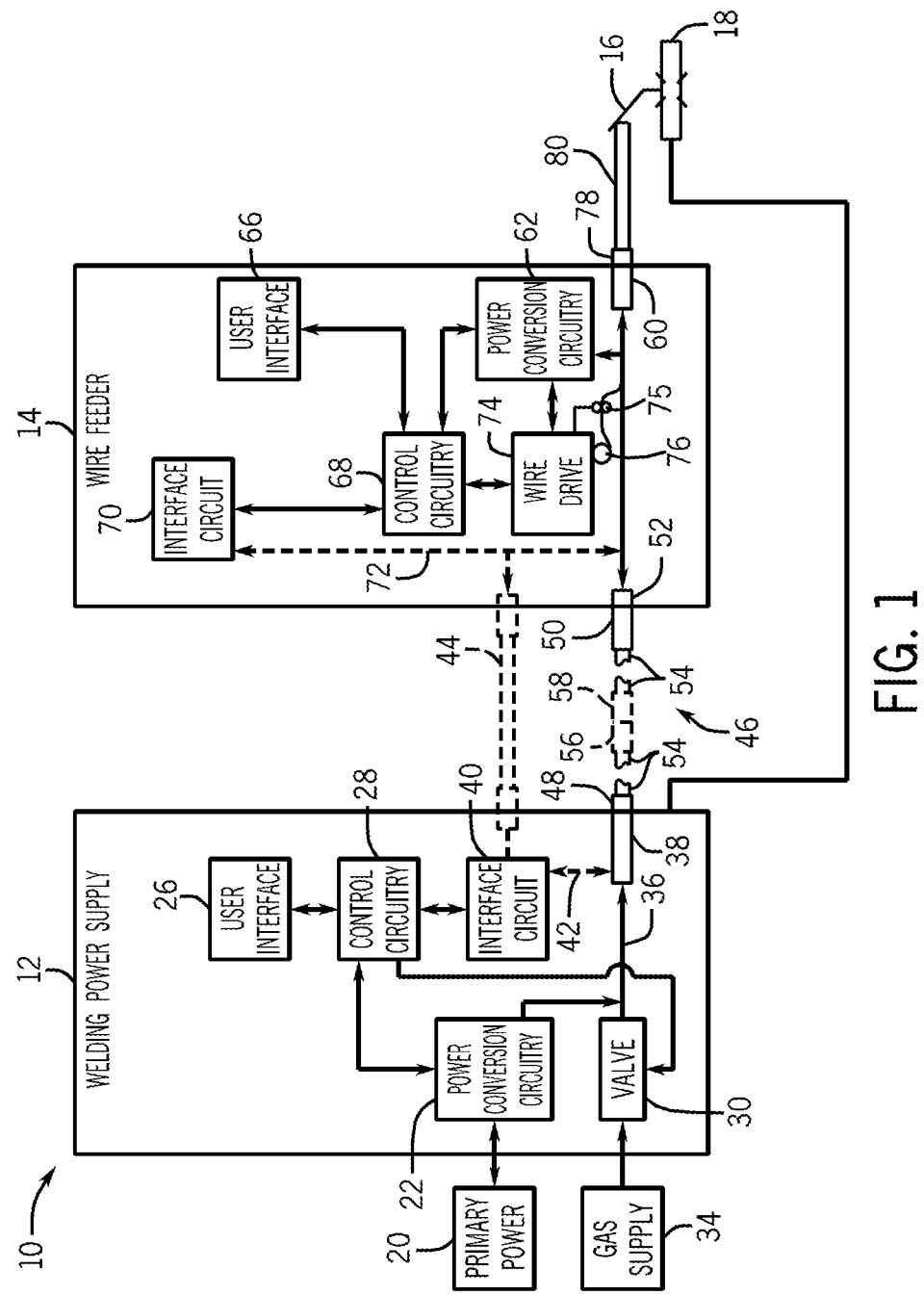
FIG. 1 is a schematic diagram of an exemplary welding system in accordance with aspects of the present disclosure.

Turning now to the figures, FIG. 1 is a schematic diagram of an exemplary welding system 10 which powers, controls, and provides supplies to a welding operation. The welding system 10 includes a welding power supply 12, a wire feeder 14, a torch 16, and a workpiece 18. The welding power supply 12 receives primary power 20 (e.g., from the AC power grid, an engine/generator set, a battery, or a combination thereof), conditions the input power, and provides an output power to one or more welding devices in accordance with demands of the system 10. The primary power 20 may be supplied from an offsite location (i.e., the primary power may originate from a wall outlet). The welding power source 12 includes power conversion circuitry 22 that may include circuit elements such as transformers, rectifiers, switches, and so forth, capable of converting the AC input power to a DCEP or DCEN output as dictated by the demands of the system 10. Such circuits are generally known in the art. It should be noted, however, that the cable structures disclosed herein may be used with any desired welding application or process that relies on the provision of power and shielding gas. This might include, for example, AC welding processes, DC welding processes, pulsed and short circuit welding processes, hybrid processes, and so forth. Moreover, the cabling may be used for such processes and may channel power and gas when needed, but may still be used when other processes are employed that do not require shielding gas. When this type of process is selected, the flow of gas through the cable is simply stopped by system valving of a conventional type.

In some embodiments, the power conversion circuitry 22 may be configured to convert the primary power to both weld and auxiliary power outputs. However, in other embodiments, the power conversion circuitry 22 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes a user interface 26 and control circuitry 28. The control circuitry 28 controls the operations of the welding power supply 12 and may receive input from the user interface 26 through which a user may choose a process, and input desired parameters (e.g., voltages, currents, particular pulsed or non-pulsed welding regimes, and so forth). The control circuitry 28 may also be configured to receive and process a plurality of inputs regarding the performance and demands of the system 10. Furthermore, the control circuitry 28 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation.

The welding power supply 12 may also include a valve 30 to modulate the amount of gas supplied to a welding operation. The valve 30 operates with signals from the control circuitry 28. A gas supply 34 may provide shielding gases, such as argon, helium, carbon dioxide, and so forth. The gas enters valve 30 then exits the valve through cable 36. As illustrated, the gas and power are combined into the cable 36. As such, the cable 36 supplies the wire feeder 14 and/or torch 16 with gas and power. The cable 36 is coupled to connector 38. The connector 38 is a female box mount connector that is mounted to the welding power supply 12. In certain embodiments, the connector 38 may be a male box mount connector, or the connector 38 may be any connector that can combine gas and power connections therethrough.

Data is communicated between the control circuitry 28 and an interface circuit 40. The interface circuit 40 conditions the data from the control circuitry 28 for communication to other welding devices, such as a wire feeder 14 and a pendant. The interface circuit 40 may be connected to connector 38 for transmission of data combined with the power and gas. In another embodiment, data conditioned in the welding power supply 12 is communicated to the wire feeder 14 over a control cable assembly 44. Certain power signals may also be transmitted over the control cable assembly 44.

A cable assembly 46 connects the welding power supply 12 to the wire feeder 14. A male connector assembly 48 is coupled to connector 38 on the power supply 12 and a female connector assembly 50 is coupled to a male box mount connector 52 on the wire feeder 14. In certain embodiments, the connector 52 may be a female box mounted connector, or connector 52 may be another type of connector. Furthermore, in other embodiments, the connector assemblies 48 and 50 may be male or female assemblies such that connector assemblies 48 and 50 mate with connectors 38 and 52 respectively. The cable assembly 46 includes a cable 54 coupled to connector assemblies 48 and 50. In addition, the cable assembly 46 may include multiple cables, such that the assembly may include connector assemblies 56 and 58. Likewise, one, two or more cables may be part of the assembly 46. The workpiece 18 is also coupled to the welding power supply 12 to provide a return path for welding power.

Gas and power run between the connector 52 and a female box mount connector 60. Again, the connector 60 may be a male box mount connector, or any other connector that can carry gas and power. A power conversion circuitry 62 is powered from the gas/power cable. The wire feeder 14 also includes a user interface 66 and control circuitry 68. The power conversion circuitry 62 powers the control circuitry 68. The control circuitry 68 functions similar to control circuitry 28, but controls the functionality of the wire feeder 14. The control circuitry 68 may receive input from the user interface 66 through which a user may input desired parameters (e.g., voltages, currents, wire speed, and so forth). Further, an interface circuit 70 may receive signals from control circuitry 68 for transmission to the welding power supply 12. Conditioned data is received by the wire feeder 14 and converted by the interface circuit 70 to signals compatible with the control circuitry 68. The interface circuit 70 may receive conditioned data either through cable 44, or through cable assembly 46 as illustrated. The wire feeder 14 also includes a wire drive 74 that receives control signals from the control circuit 68 to drive rollers 75 that cause wire to be fed from a wire spool 76. Gas and power are transferred out of the wire feeder 14 through connector 60. A male connector assembly 78 coupled to a cable 80 enable the gas and power to be provided to the torch 16 for a welding operation. In certain embodiments, the connector assembly 78 may be a female connector assembly. It should be noted that the gas flowing through the cable assembly 46, or the cable 80 may have a cooling effect on the cable. Further, each of the connector assemblies described above may be constructed using a Schrader valve, or another preassembled valve assembly.

Figure 2:
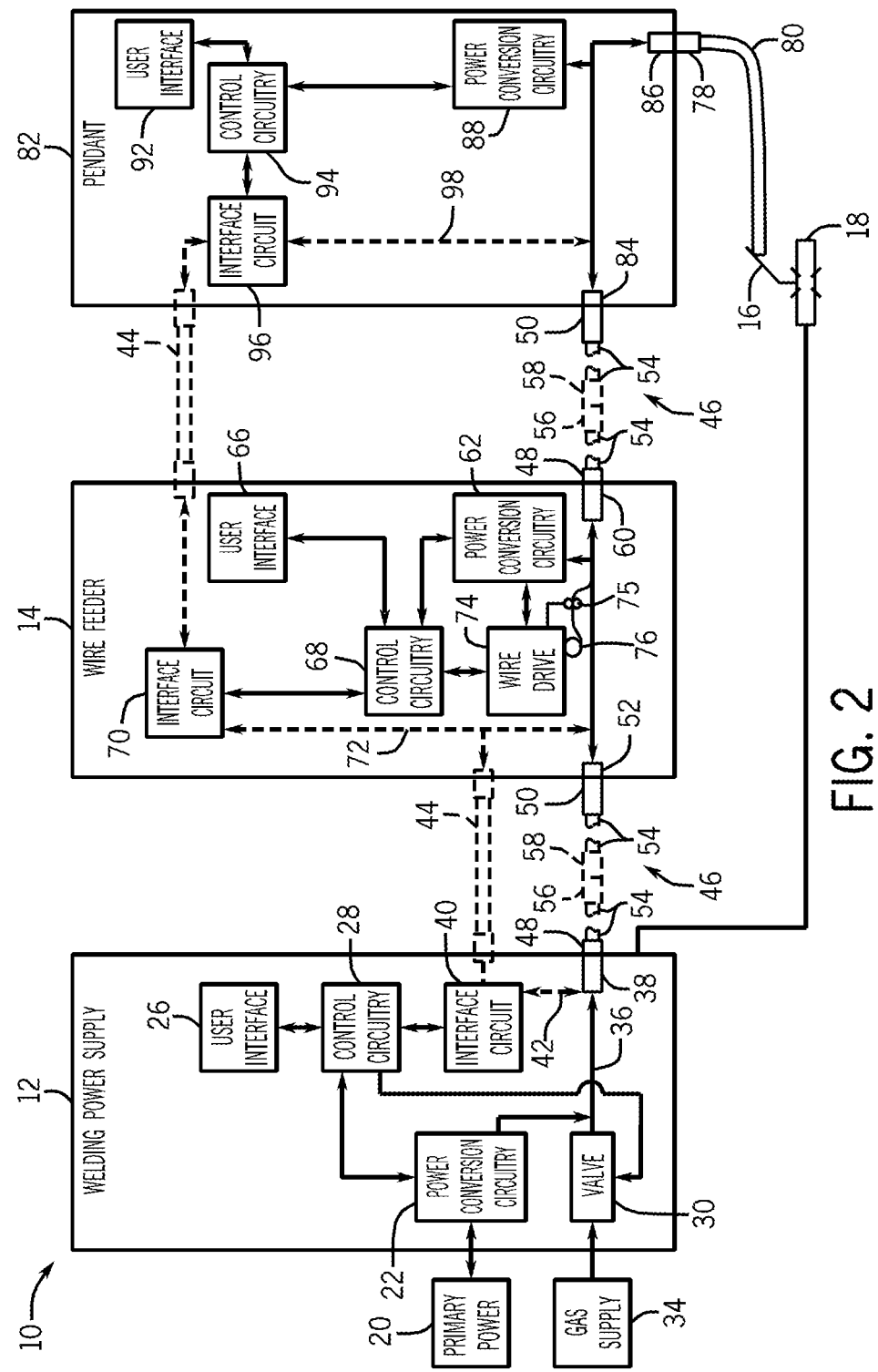
FIG. 2 is a schematic diagram of an exemplary welding system including a pendant in accordance with aspects of the present disclosure.

FIG. 2 is a schematic diagram of an exemplary welding system 10 including a pendant 82. The welding power supply 12, wire feeder 14, and torch 16 function in a similar manner as described in relation to FIG. 1. As illustrated, a second cable assembly 46 connects between connector 60 of the wire feeder 14 and a male box connector 84 of the pendant 82. As previously described, gas and power are carried by cable assembly 46. The gas and power exit the pendant 82 through a female box connector 86 to provide gas and power to the torch 16. In certain embodiments, connectors 84 and 86 may be either male or female and may be any type of connector that can carry gas and power. The pendant 82 also includes power conversion circuitry 88, a user interface 92, control circuitry 94, and an interface circuit 96. The circuits and interfaces of the pendant 82 function in a similar manner to the similarly named circuits and interfaces previously described, thus controlling the operation of the pendant. A second control cable assembly 44 communicates control data and/or power between the wire feeder 14 and the pendant 82. The interface circuit 96 may either receive data via cable assembly 44 or via connection 98 from the gas and power cable. As may be appreciated, each of the connector assemblies described above may be constructed using a Schrader valve, or another preassembled valve assembly.

Figure 3:
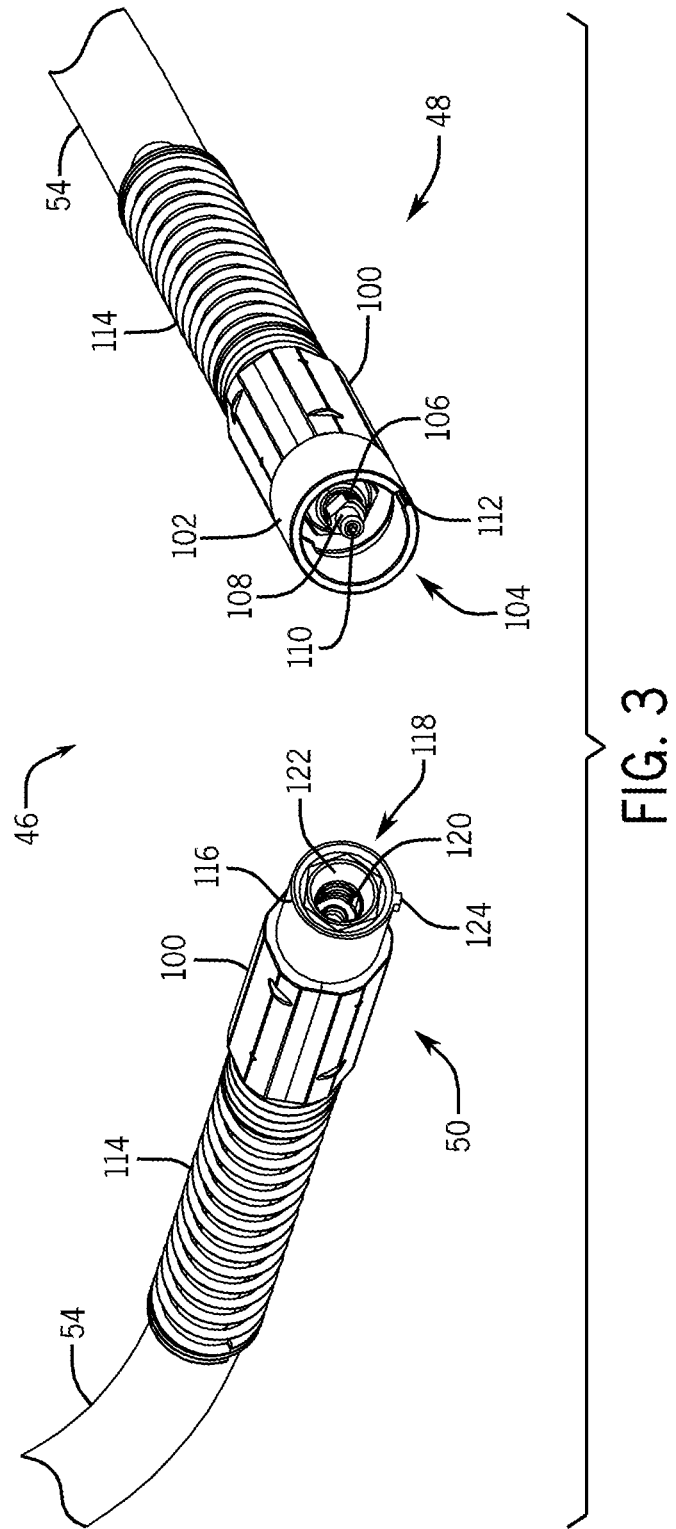
FIG. 3 is a perspective view of an embodiment of a welding cable assembly.

FIG. 3 is a perspective view of an embodiment of a welding cable assembly 46. The male connector assembly 48 and female connector assembly 50 are connected via a cable 54. The male connector assembly 48 includes a collar 100 and a collar extension 102 that encompasses a male connector 104. The male connector 104 includes keyed threads 106 and a fitting 108. The fitting 108 houses the gas valve which includes a plunger 110 portion of a preassembled valve assembly (e.g., Schrader valve, tire valve, etc.) extending out of the fitting 108. A collar key notch 112 enables proper mating between male and female connector assemblies. A spring 114 is disposed around the cable 54 adjacent to the collar 100. The spring 114 may be part of a strain relief assembly. The strain relief assembly may also include a spring retainer (not shown) to hold the spring 114 in place. Further, the spring 114 may be double pitched to enable the spring to mate with the spring retainer. For example, the spring 114 may include coils, such as approximately 10 coils, with a pitch such as approximately 0.16 inches to enable the spring 114 to be threaded onto the spring retainer. The remainder of the threads may be pitched at approximately 0.625 inches to enable a large radius bend. In addition, the spring retainer may be captured within the collar 100 to hold the retainer and spring 114 behind the collar 100.

The female connector assembly 50 also includes the collar 100 and a collar extension 116 that encompasses a female connector 118. The female connector 118 includes keyed threads 120 and a tapered surface 122. The tapered surface 122 contacts a tapered surface of the male connector 104 in order to conduct electric current between the male and female connectors. Further, the tapered surface 122 may engage the male connector 104 such that the surface maintains a tight engagement with a mating connector. In addition, the tapered surface 122 may initiate cleaning action to enable increased electrical conductivity. A collar key 124 enables proper mating between male and female connector assemblies. The female connector assembly 50 also includes the spring 114 and may include a strain relief assembly as described above.

As may be appreciated, the spring 114 on the male or female connector assemblies 48 and 50 may be configured different than described above. For example, in certain embodiments the spring 114 may have only a single pitch, or the spring 114 may be double pitched with a first set of coils (which may be greater or less than 10 coils) having a pitch less than or greater than approximately 0.16 inches and the remainder of the coils having a pitch less than or greater than approximately 0.625 inches. The collar 100 and the collar extensions 102 and 116 may inhibit the connectors 104 and 118 from contacting other surfaces. As such, the connectors 104 and 118 may be inhibited from inadvertent electrical contact with an undesired surface. Further, the connectors 104 and 118 may be protected from physical impact with other surfaces.

Figure 4:
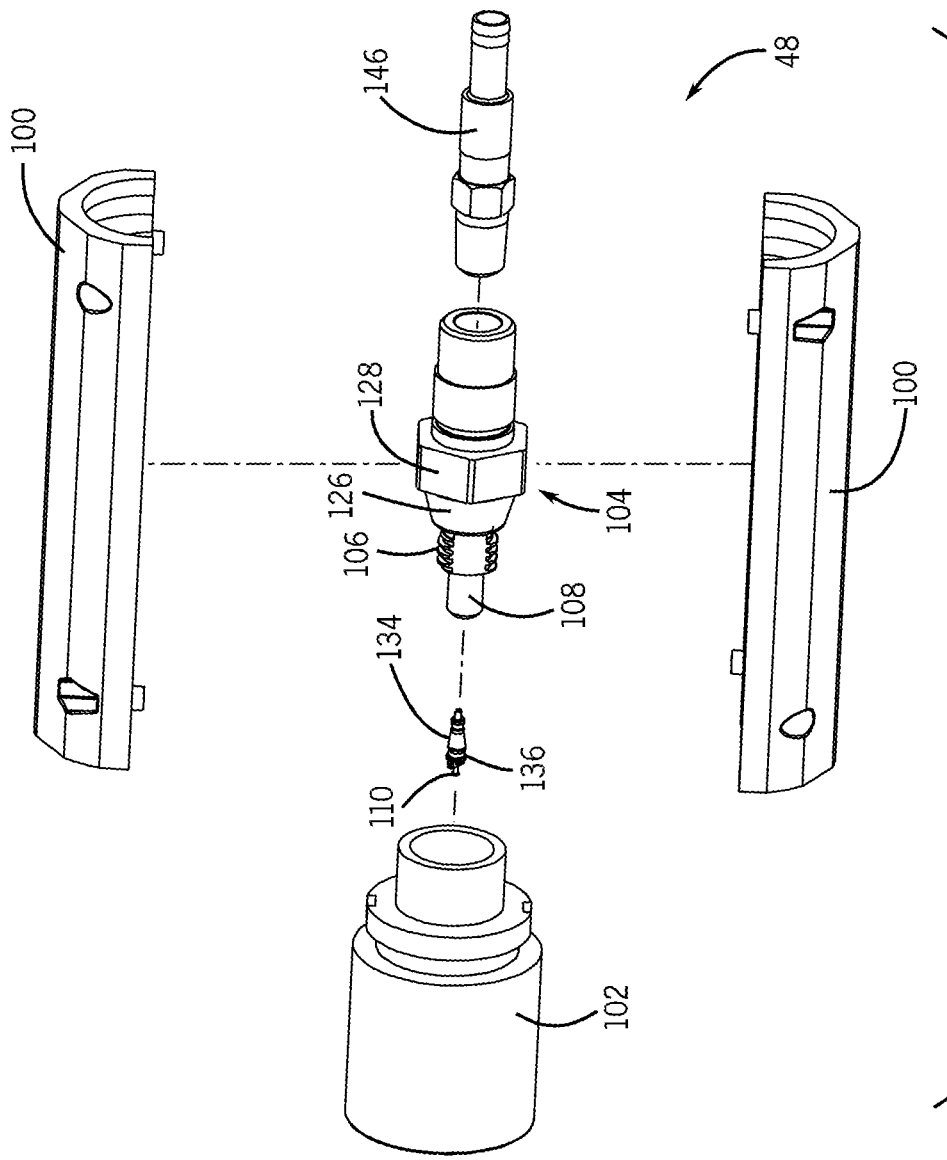
FIG. 4 is an exploded view of an embodiment of a male connector assembly of a welding cable assembly.

FIG. 4 is an exploded view of an embodiment of a male connector assembly 48 of a welding cable assembly. The male connector assembly 48 includes the collar 100 with two sections that are assembled on the outside of the male connector 104, such as via screws. The collar extension 102 is mounted over the front of the male connector 104. The collar 100 and the collar extension 102 may be made of plastic, rubber, polymer, or other material that provides protection to the male connector 104. The male connector 104 includes the keyed threads 106 and the fitting 108. The keyed threads 106 are keyed to mate with the keyed threads of the female connector 118 via a ¼ turn twist-lock in order to hold the male and female connectors engaged. The threads of the male and female connectors may be keyed per U.S. Pat. No. 7,377,825, entitled "High-power Electrical Quick Connector" to Bankstahl, which is hereby incorporated by reference. The male connector 104 also includes a tapered surface 126 and a nut 128. The tapered surface 126 is tapered to match the taper on the female connector 118. The tapered surfaces of the male and female connectors contact each other to provide a conductive pathway for welding power to flow. The tapered surface 126 may include any degree of taper such that the angle provides a good contact between the connectors. For example, the taper may be approximately 100, 110, 115, or 135 degrees. The nut 128 is used to tighten a cable adaptor onto the male connector 104. The male connector 104 may be made of brass, nickel, stainless steel, or another conductive material sufficient to conduct power and carry gas.

The plunger 110 (or extension) is part of a preassembled valve assembly 134. In certain embodiments, the preassembled valve assembly 134 may be a Schrader valve, a tire valve, a tyre valve, an American valve, or another type of preassembled valve assembly. Further, the preassembled valve assembly 134 may include 5V1 size threading and may be one of many different grades (e.g., tire grade, aircraft grade, etc.). The plunger 110 extends out of the preassembled valve assembly 134. The preassembled valve assembly 134 includes threads 136 which threadingly engaged matching threads within a passageway of the male connector 104. Thus, gas is inhibited from flowing through the male connector 104 when the preassembled valve assembly 134 is properly installed and not engaged with another valve assembly, forming a sealed passageway within the male connector 104. As will be appreciated, the preassembled valve assembly 134 is mechanically unseated and allows gas to flow through the male connector 104 upon mating of the male connector 104. An adaptor 146 is secured to the male connector 104 and enables the connector 104 to be attached to a welding cable, such as a ¼ inch pipe thread crimped to a weld cable of a type commercially available from Bernard of Beecher, Illinois Using the preassembled valve assembly 134, the male connector assembly 48 is manufactured in a more efficient and simplified manner using fewer components.

Figure 5:
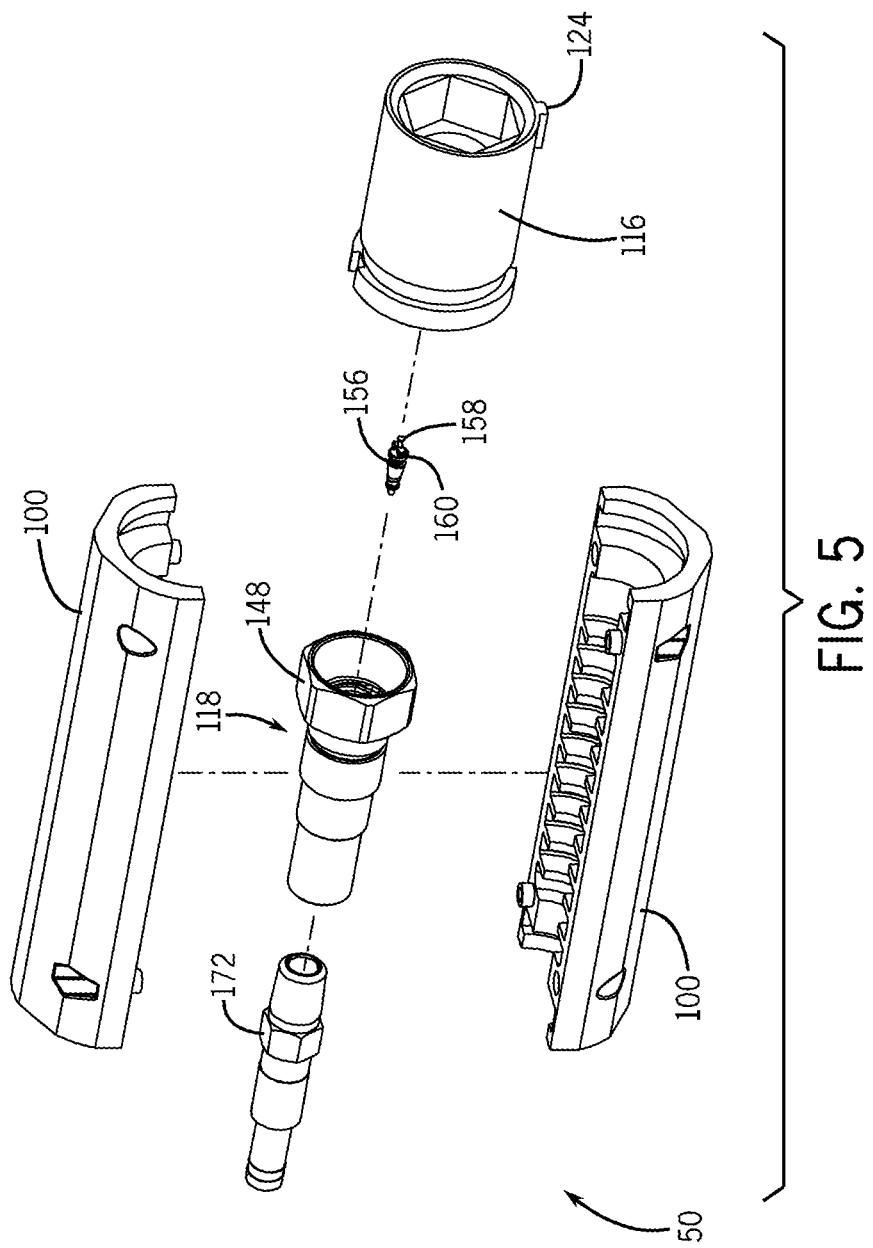
FIG. 5 is an exploded view of an embodiment of a female connector assembly of a welding cable assembly.

FIG. 5 is an exploded view of an embodiment of a female connector assembly 50 of a welding cable assembly. The female connector assembly 50 includes the collar 100 with two sections that are assembled on the outside of the female connector 118, such as via screws. The collar extension 116 is mounted over the front of the female connector 118. The collar 100 and collar extension 116 may be made of plastic, rubber, polymer, or other material that provides protection to the female connector 118. The female connector 118 also includes a nut 148. The nut 148 fits within the similar shaped interior of the collar extension 116. The female connector 118 may be made of brass, nickel, stainless steel, or another conductive material sufficient to conduct power and carry gas.

A preassembled valve assembly 156 includes a plunger 158 (or extension). In certain embodiments, the preassembled valve assembly 156 may be a Schrader valve, a tire valve, a tyre valve, an American valve, or another type of preassembled valve assembly. Further, the preassembled valve assembly 156 may include 5V1 size threading and may be one of many different grades (e.g., tire grade, aircraft grade, etc.). The plunger 158 extends out of the preassembled valve assembly 156. The preassembled valve assembly 156 includes threads 160 which threadingly engage matching threads within the female connector 118. Thus, gas is inhibited from flowing through the female connector 118 when the preassembled valve assembly 156 is properly installed and not engaged with another valve assembly, forming a sealed passageway within the female connector 118. As will be appreciated, the preassembled valve assembly 156 is mechanically unseated and allows gas to flow through the female connector 118 upon mating of the female connector 118. An adaptor 172 is secured to the female connector 118 and enables the connector 118 to be attached to a welding cable, such as a ¼ inch weld cable of a type commercially available from Bernard of Beecher, Illinois Using the preassembled valve assembly 156, the female connector assembly 50 is manufactured in a more efficient and simplified manner using fewer components.

Figure 6:
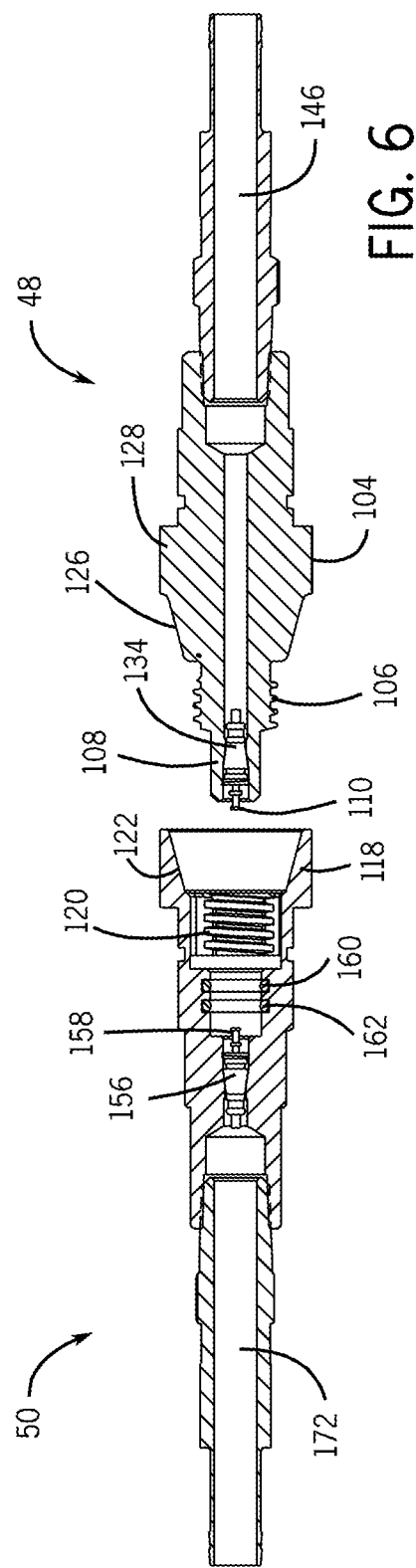
FIG. 6 is a cross-sectional side view of an embodiment of male and female connector assemblies of a welding cable assembly.

FIG. 6 is a cross-sectional side view of an embodiment of male and female connector assemblies of a welding cable assembly. The illustration of the male connector assembly 48 depicts the plunger 110 of the preassembled valve assembly 134 extending out of the fitting 108. The preassembled valve assembly 134 is threadingly engaged with the male connector 104. The preassembled valve assembly 134 creates a seal to inhibit gas from escaping through the fitting 108. When the plunger 110 is depressed, the seal is opened and gas can flow through the male connector 104. For example, when the male connector 104 is mated with the female connector 118, the plungers 110 and 158 press against each other to unseat the valve assembly seals and enable gas to flow through each connector. Further, as illustrated within the female connector 50, o-rings 160 and 162 provide a seal around the fitting 108 when the fitting is inserted through the o-rings. By using two o-rings, the o-rings 160 and 162 may create a double seal, or one o-ring 160 may act as a wiper to clean dirt or debris off of the fitting 108, while the other o-ring 162 creates a seal. The keyed threads 120 and 106 are also depicted, illustrating how the male and female connectors are coupled together.

Figure 7:
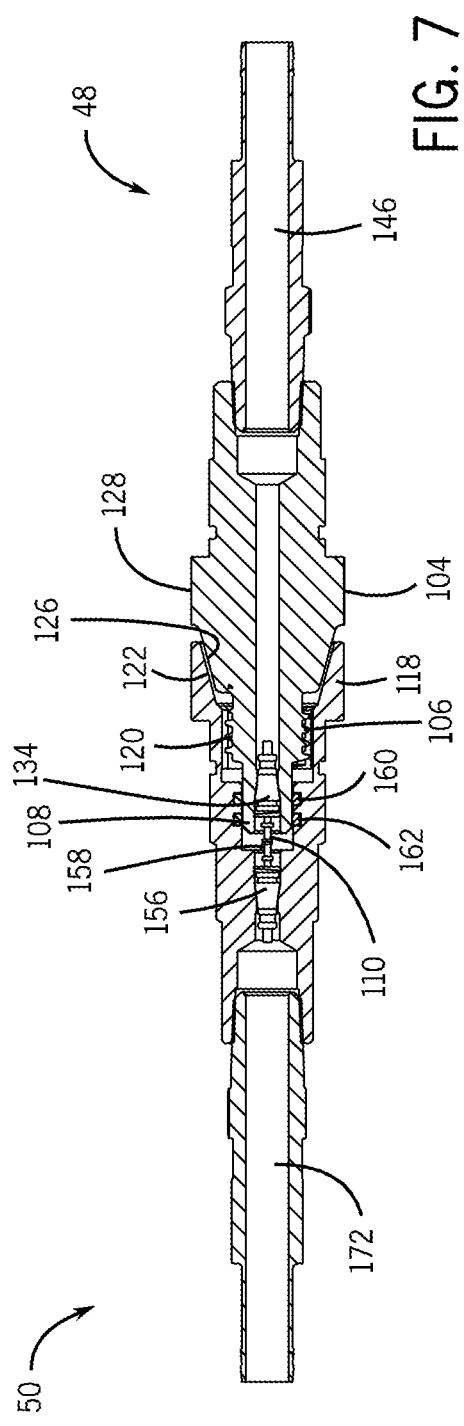
FIG. 7 is a cross-sectional side view of the embodiment of FIG. 6 with the male and female connector assemblies mated.

FIG. 7 is a cross-sectional side view of the embodiment of FIG. 6 with the male and female connector assemblies mated. As illustrated, the plunger 110 presses against the plunger 154 to enable gas to flow between the connectors. Further, the threads 106 are coupled to the threads 120 and the fitting 108 is positioned within o-rings 160 and 162. The tapered surfaces 126 and 122 contact each other to enable power to be conducted between the connectors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding cable connector system comprising:
a male connector comprising a first conductive body for conveying welding power, a first sealed passageway disposed coaxially of the first conductive body for conveying shielding gas, and a first preassembled valve assembly coupled to threads within the first sealed passageway and configured to stop flow of the shielding gas when the male connector is not engaged;
a female connector comprising a second conductive body for conveying the welding power, a second sealed passageway disposed coaxially of the second conductive body for conveying the shielding gas, and a second preassembled valve assembly coupled to threads within the second sealed passageway and configured to stop the flow of the shielding gas when the female connector is not engaged; and
a welding cable coupled to at least one of the male and female connectors for conveying the welding power and the shielding gas to or from the at least one of the male and female connectors to which the welding cable is coupled;
wherein the male and female connectors are mutually engageable to conduct the welding power and the shielding gas therethrough,
wherein the male and female connectors are configured to mate by a twist-lock structure to mechanically hold the male and female connectors engaged, and
wherein the first and second preassembled valve assemblies seal the flow of the shielding gas when the male and female connectors are not mutually engaged, and
wherein the male connector comprises a first collar extension that encompasses the first preassembled valve assembly to protect the first preassembled valve assembly from damage and the female connector comprises a second collar extension that encompasses the second preassembled valve assembly to protect the second preassembled valve assembly from damage, wherein the second collar extension is located between the first preassembled valve assembly and the first collar extension in a radial direction when the male and female connectors are engaged.

2. The system of claim 1, wherein the welding cable is coupled to the male connector at one end thereof and to the female connector at an opposite end thereof.

3. The system of claim 1, wherein each of the first and second preassembled valve assemblies is mechanically unseated upon mating of the male and female connectors.

4. The system of claim 1, wherein each of the first and second preassembled valve assemblies comprises a Schrader valve.

5. The system of claim 1, comprising a first spring assembly disposed around the welding cable adjacent to the male connector and a second spring assembly disposed around the welding cable adjacent to the female connector.

* * * * *